Nov. 19, 1929.   J. HOJNOWSKI   1,736,263
AERONAUTICAL VESSEL
Filed Oct. 12, 1928   2 Sheets-Sheet 1
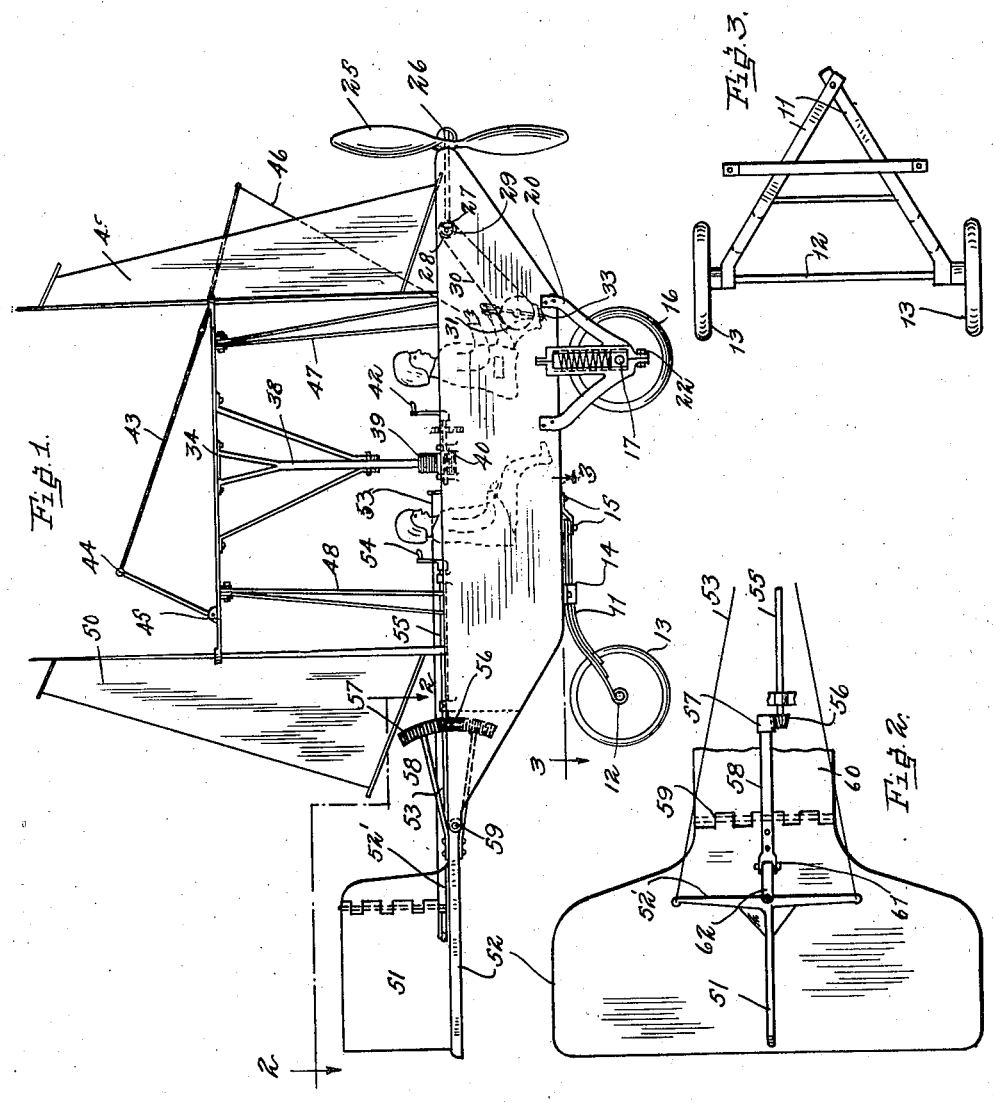
Inventor
Jakob Hojnowski Nov. 19, 1929.  J. HOJNOWSKI  1,736,263
AERONAUTICAL VESSEL
Filed Oct. 12, 1928  2 Sheets-Sheet 2
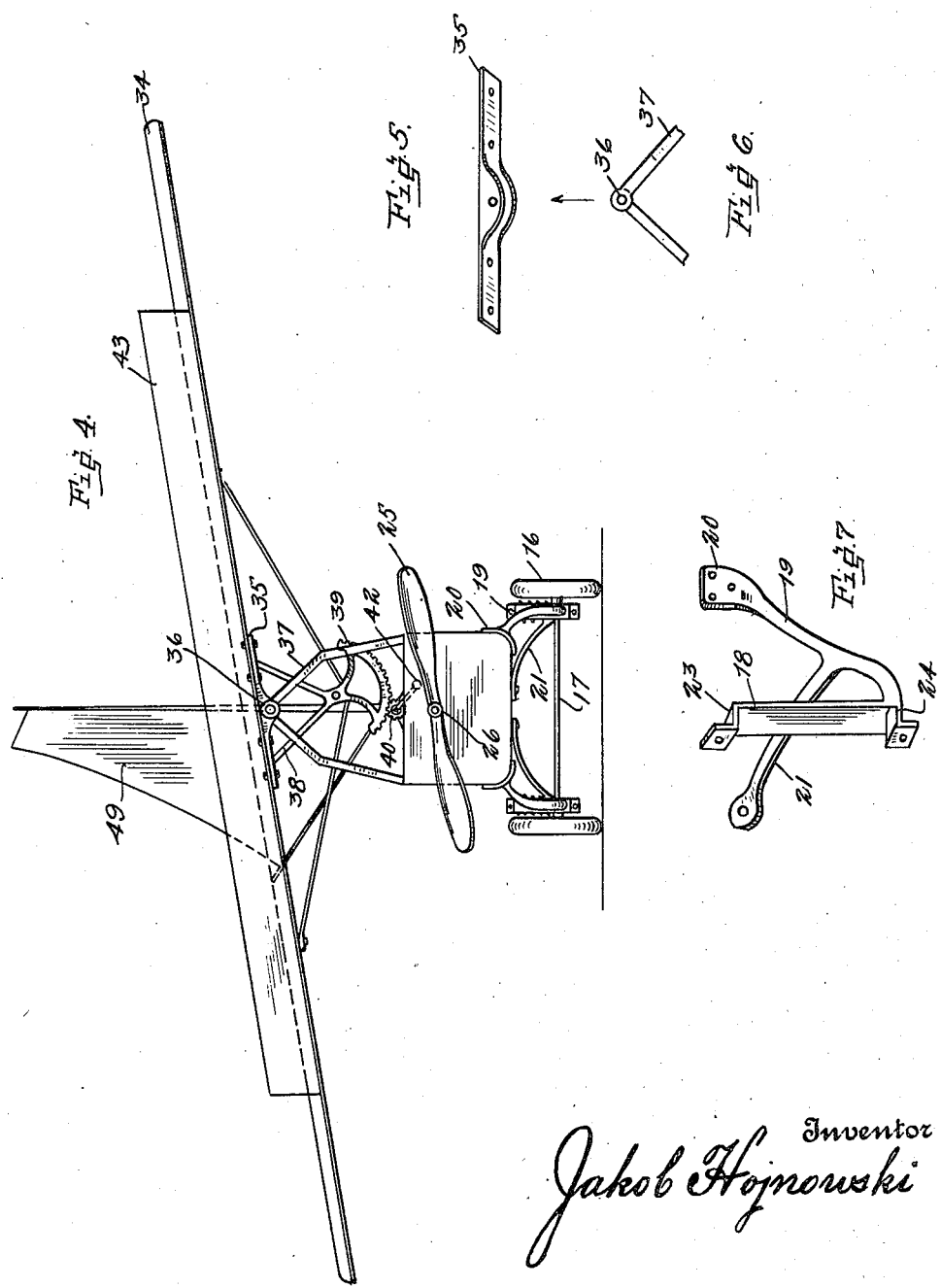
Inventor
Jakob Hojnowski Patented Nov. 19, 1929

1,736,263

UNITED STATES PATENT OFFICE

JAKOB HOJNOWSKI, OF NEKOOSA, WISCONSIN

AERONAUTICAL VESSEL

Application filed October 12, 1928. Serial No. 312,086.

This invention relates to improvements in aeronautical vessels and it is the principal object of my invention to provide an aeroplane adapted to be propelled in the manner of a bicycle and by the aid of stabilizing sails and wings.

Another object of my invention is the provision of an aeroplane of this character equipped with means for successfully absorbing the shocks during the starting and landing operations.

A further object of my invention is the provision of an aeroplane of said type provided with efficiently operating rudders and adjustable wings.

A still further object of my invention is the provision of an aeroplane of simple and inexpensive construction avoiding the necessity of employing expensive motors and accessories, which however, is durable and efficient in operation.

These and other objects and advantages of my invention will become more fully known as the description thereof proceeds and will then be specifically defined in the appended claims.

In the accompanying drawings forming a material part of this disclosure:

Figure 1 is a side elevation of an aeronautic vessel constructed according to my invention.

Figure 2 is a top plan view of part of the vessel seen in the direction of arrows 2—2 of Figure 1.

Figure 3 is a top plan view of part of the starting and landing gear, seen in the direction of arrows 3—3 of Figure 1.

Figure 4 is an end view of the aeronautic vessel, and

Figures 5, 6, and 7, are detail views of the frame construction of the vessel.

As illustrated, the aeronautic vessel constructed according to my invention comprises a body 10 having preferably the form of a boat equipped at its lower rear part with a landing gear composed of a frame, generally designated 11, the inclined rearwardly extending side elements of the frame have the form of laminated springs as shown in Figure 1, and carry at their ends the bearings for the axle 12 for the rear wheels 13 while the front and middle part of the frame is suitably fastened as at 14, 15 to the underside of the body.

The front part of the body is supported by wheels 16 on the ends of an axle 17 which is journalled in bearings each composed of a pair of brackets 18 having an arm 19 secured thereto at its lower end, and its upper end is formed into a holder 20 attached to the outer lower edges of the body 10 as shown in Figure 4, while a laterally extending arm 21 is adapted to be secured to the bottom of body 10. Strong spiral springs 22 are provided within the housing formed by two of brackets 18, as shown, the upper end of the spring resting against the upper shoulder 23 and the lower end on the axle 17 resting on the lower shoulder 24 formed by each pair of brackets as shown in Figure 1.

The vessel is propelled by means of a propeller 25 on its axle 26, the inner end of which carries a bevel gear 27 meshing with a bevel gear 28 on a shaft 19 which also carries a sprocket wheel over which a sprocket chain 30 is guided, which is also guided over a sprocket wheel 31 on a shaft 32 carrying the pedals 33 adapted to be propelled by the pilot of the vessel.

The wing 34 of the vessel is bolted in approximately its middle to a bracket 35 pivoted on a pin 36 in its center resting at the apex of an angle iron 37 having its feet erected on the body 10.

To bracket 35 is also secured a frame 38 having its lower edge formed into a toothed segment 39 adapted to engage a toothed wheel or gear 40 the shaft 41 of which carries a crank 42. The upper part 43 of wing 34 is displaceable and tiltable about pivots 44 and 45 by means of a cable 46 secured at the front end of the wing and guided within convenient reach by the operator for drawing the edge of part 43 over the forward edge of wing 34. Auxiliary braces 47 brace wing 34 and frame 38.

Sails 49 and 50 fore and aft are arranged in the usual well known manner between upper and lower spars movable along masts, and act as stabilizers and can conveniently be folded and operated to suit the particular occasion.

A rudder is provided at the rear of the plane and comprising the vertical blade or fin 51 acting as horizontal steering means on top of a rudder 52 for lifting and lowering. The fin 51 is operated by means of a pair of cables 53 secured at the ends of a tree 52' and adapted to be operated by the co-pilot, while the rudder 52 is operated by means of a crank 54 on shaft 55 carrying at its end opposite to the crank a conical gear 56 in mesh with a toothed segment 57 secured by means of braces 58 to the front end of rudder 52, which is attached by means of a knuckle joint 59 to a plate 60 on the body 10. The braces 58 are secured at their inner ends by a pin and fork connection 61 to a link 62 attached to the middle part of tree 52'.

The operation of my improved aeronautical plane or vessel will be entirely clear from the above description and simultaneous inspection of the drawings. If the pilot operates the propeller and suitably adjusts the wing, and the rudders are suitably set and operated by the co-pilot, the plane will rise and will be duly stabilized by convenient setting of the sails, while its starting and landing operations will be devoid of shocks on account of the laminated rear spring cushion and the front spiral spring bearing for the front axle much to the convenience of the operators and adapted to bring about a great saving in material otherwise wasted in broken landing gears.

It will be understood that I have disclosed the preferred form of my device only and that I may make such changes therein as come within the scope of the appended claims without departure from the spirit of my invention.

Having thus described my invention what I claim as new and desire to secure by Letters Patent is—

1. In an apparatus of the class described, a body, rear landing wheels cushioned against the body and supporting the rear part thereof, front wheels, an axle for said front wheels, a bi-partite and shouldered bracket carrying said axle, a spring in said bracket resting against the upper shoulders thereof and said axle to cushion the axle, and a plurality of arms securing said bracket to the body, propelling, stabilizing and steering means.

2. A starting and landing gear for aeronautical craft comprising in combination a yielding frame, carrying a pair of rear wheels and extending rearwardly of the craft and secured thereto, and a pair of brackets supplementing each other to form a casing having upper and lower shoulders, an axle resting on the lower shoulder and carrying front wheels, a spring between said axle and said upper shoulders, and arms integral with said brackets adapted to be secured to said craft.

Signed at Nekoosa, in the county of Wood and State of Wisconsin this 22nd day of June A. D. 1928.

JAKOB HOJNOWSKI.